United States Patent
Rangarajan et al.

(10) Patent No.: US 9,615,369 B2
(45) Date of Patent: Apr. 4, 2017

(54) AVOIDING SPURIOUS RESPONSES WITH RECONFIGURABLE LO DIVIDERS

(71) Applicant: QUALCOMM Incorporated, San Diego, CA (US)

(72) Inventors: Rajagopalan Rangarajan, San Diego, CA (US); Chiewcharn Narathong, Laguna Niguel, CA (US); Lai Kan Leung, San Marcos, CA (US); Dongling Pan, San Diego, CA (US); Aleksandar Miodrag Tasic, San Diego, CA (US); Yiwu Tang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 127 days.

(21) Appl. No.: 14/644,677

(22) Filed: Mar. 11, 2015

(65) Prior Publication Data
US 2015/0334711 A1  Nov. 19, 2015

Related U.S. Application Data

(60) Provisional application No. 61/993,117, filed on May 14, 2014.

(51) Int. Cl.
*H04W 72/04* (2009.01)
*H04L 12/709* (2013.01)
(Continued)

(52) U.S. Cl.
CPC ........ *H04W 72/0453* (2013.01); *H04B 1/005* (2013.01); *H04B 15/06* (2013.01); *H04L 45/245* (2013.01); *H04W 88/06* (2013.01)

(58) Field of Classification Search
None
See application file for complete search history.

(56) References Cited

U.S. PATENT DOCUMENTS 8,416,758 B1  4/2013  Rousu et al.
8,583,170 B2  11/2013  Sundstroem et al.
(Continued)

FOREIGN PATENT DOCUMENTS

| EP | 2590351 A2 | 5/2013 |
|---|---|---|
| GB | 2492605 A | 1/2013 |
| WO | 2009036221 A1 | 3/2009 |

OTHER PUBLICATIONS

International Search Report and Written Opinion—PCT/US2015/025991—ISA/EPO—Jun. 29, 2015.
(Continued)

*Primary Examiner* — Brian Roberts
(74) *Attorney, Agent, or Firm* — Procopio, Cory, Hargreaves & Savitch LLP

(57) ABSTRACT

Methods and apparatus including: setting up a plurality of configurations for a plurality of local oscillator (LO) paths of a carrier aggregation (CA) transceiver operating with a plurality of bands; calculating and comparing frequencies for each LO path of the plurality of LO paths and at least one divider ratio of LO dividers for each band of the plurality of bands to identify frequency conflicts; and reconfiguring the LO dividers for the plurality of LO paths and the plurality of bands when the frequency conflicts are identified.

26 Claims, 12 Drawing Sheets

(51) Int. Cl.
*H04W 88/06* (2009.01)
*H04B 1/00* (2006.01)
*H04B 15/06* (2006.01)

(56) References Cited

U.S. PATENT DOCUMENTS

| | | |
|---|---|---|
| 9,232,562 B2 * | 1/2016 | Liu ................... H04W 88/06 |
| 2008/0039045 A1 | 2/2008 | Filipovic et al. |
| 2008/0186949 A1 | 8/2008 | Hafeez et al. |
| 2008/0220807 A1 | 9/2008 | Patel et al. |
| 2009/0227214 A1 | 9/2009 | Georgantas et al. |
| 2010/0040184 A1 | 2/2010 | Haralabidis et al. |
| 2010/0210272 A1 * | 8/2010 | Sundstrom ........... H04B 1/0082 455/450 |
| 2010/0323636 A1 | 12/2010 | Cowley et al. |
| 2013/0229954 A1 | 9/2013 | Narathong et al. |
| 2014/0153616 A1 | 6/2014 | Sabouri et al. |
| 2014/0370882 A1 | 12/2014 | Liu et al. |
| 2015/0078497 A1 * | 3/2015 | Zhang ................... H04B 1/005 375/347 |

OTHER PUBLICATIONS

Zeng L., et al., "A Novel Cross-Carrier Scheduling Method in Carrier Aggregation," International Conference on Computational Problem-Solving (ICCP), 2013, pp. 312-315.

* cited by examiner

AVOIDING SPURIOUS RESPONSES WITH RECONFIGURABLE LO DIVIDERS

CROSS-REFERENCE TO RELATED APPLICATIONS

This application claims the benefit of priority under 35 U.S.C. §119(e) of U.S. Provisional Patent Application No. 61/993,117, filed May 14, 2014, entitled "Avoiding Spurious Responses with Reconfigurable LO Dividers." The disclosure of the above-referenced application is incorporated herein by reference.

BACKGROUND

Field

This disclosure relates generally to a carrier aggregation (CA) transceiver, and more specifically, to reconfiguring local oscillator dividers in the CA transceiver.

Background

A wireless device in a communication system may transmit data using a transmitter and receive data using a receiver for two-way communication. The wireless device may also support carrier aggregation, which is simultaneous operation on multiple carriers. A carrier may refer to a range of frequencies (sometimes referred to as "band") used for communication and may be associated with certain characteristics such as system information describing operation on the carrier. Thus, it is desirable to efficiently support carrier aggregation by the wireless device.

The demand for faster data rates is increasingly driving the concurrent operations in multiple bands. For example, new bands such as B42/B43 (e.g., at 3.5 GHz) are being added to support additional spectrum for increased data rates. Thus, a carrier may perform, for example, concurrent four downlink (DL) and one uplink (UL) operations with frequencies in B3, B7, B7 intra, and B42 bands. In this example, multiple mechanisms of spurious responses due to low-noise amplifier (LNA) non-linearities (e.g., out-of-band (OOB) 2nd order intercept point (IP2)/3rd order intercept point (IP3) distortions) cause mixing of coupled voltage-controlled oscillator (VCO) signals with transmit (Tx) signals to interfere with one of the bands to cause receiver desensitization. Further, the choice of local oscillator (LO) divider ratios for different bands may result in the VCO frequencies being close to each other (for different LO frequencies), which can cause spurious responses including integrated phase noise (IPN) and error vector magnitude (EVM) degradation. To address these problems, a configuration in which the VCOs are divided into two chips to reduce the coupling issues have been proposed. However, the two-chip solution may reduce the coupling issues somewhat, but creates more problems because it will occupy more chip area and consume more current.

SUMMARY

The present disclosure provides for methods and apparatus reconfiguring LO dividers in a carrier aggregation (CA) transceiver having a plurality of LO paths.

In one embodiment, a method includes: setting up a plurality of configurations for a plurality of local oscillator (LO) paths of a carrier aggregation (CA) transceiver operating with a plurality of bands; calculating and comparing frequencies for each LO path of the plurality of LO paths and at least one divider ratio of LO dividers for each band of the plurality of bands to identify frequency conflicts; and reconfiguring the LO dividers for the plurality of LO paths and the plurality of bands when the frequency conflicts are identified.

In another embodiment, an apparatus includes: means for setting up a plurality of configurations for a plurality of local oscillator (LO) paths of a carrier aggregation (CA) transceiver operating with a plurality of bands; means for calculating and comparing frequencies for each LO path of the plurality of LO paths and at least one divider ratio of LO dividers for each band of the plurality of bands to identify frequency conflicts; and means for reconfiguring the LO dividers for the plurality of LO paths and the plurality of bands when the frequency conflicts are identified.

In another embodiment, a method includes: first assigning a plurality of divider ratios of LO dividers in a CA transceiver to a plurality of serving cells; second assigning a plurality of LO paths to the plurality of serving cells; calculating and comparing frequencies for each LO path of the plurality of LO paths to identify frequency conflicts; and reconfiguring the LO dividers for the plurality of LO paths when the frequency conflicts are identified.

In another embodiment, a carrier aggregation (CA) transceiver includes: a plurality of local oscillator (LO) paths configured to operate with a plurality of bands; and a processor coupled to the plurality of LO paths and configured to calculate and compare frequencies for each LO path of the plurality of LO paths and at least one divider ratio of LO dividers for each band of the plurality of bands to identify frequency conflicts, the processor configured to reconfigure the LO dividers for the plurality of LO paths and the plurality of bands when the frequency conflicts are identified.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As described above, two or more wireless transceivers operating concurrently in multiple bands may cause interference problems for the reception of downlinks or received signals from a broadcast system such as Global Positioning System (GPS).

Embodiments as described herein provide for reconfiguring LO dividers to avoid spurious responses in a carrier aggregation (CA) transceiver. In one embodiment, the spurious responses include a conflict in frequency. After reading this description it will become apparent how to implement the invention in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Carrier aggregation (CA) may include primary cell (Pcell) and one or more secondary cells (SCells). The receive (Rx) and transmit (Tx) frequencies are paired in PCell. In a specified band combination, the first cell specified is usually PCell. For example, in band combination B3+B7+B7+B42, B3 is PCell and B7/B7 intra and B42 are SCells. Thus, transmit and receive frequencies are in band B3, which has a duplex offset of 95 MHz. There are only receivers operating (no transmitters) in the B7/B7 intra and B42 bands. Further, in carrier aggregation, there are opportunities for reconfiguration compared with single carrier configurations. For example, for 2DL/1UL carrier aggregation, the uplink carrier could be paired with either of the downlink frequencies, for example, by swapping the designation of PCell. Accordingly, the configurations of the wireless device can be analyzed according to the characteristics such as spurious response rejection to select an optimal configuration. Although the above configurations describe only one Tx frequency operating with multiple Rx frequencies, other configurations can include more than one Tx frequency.

Figure 1A:
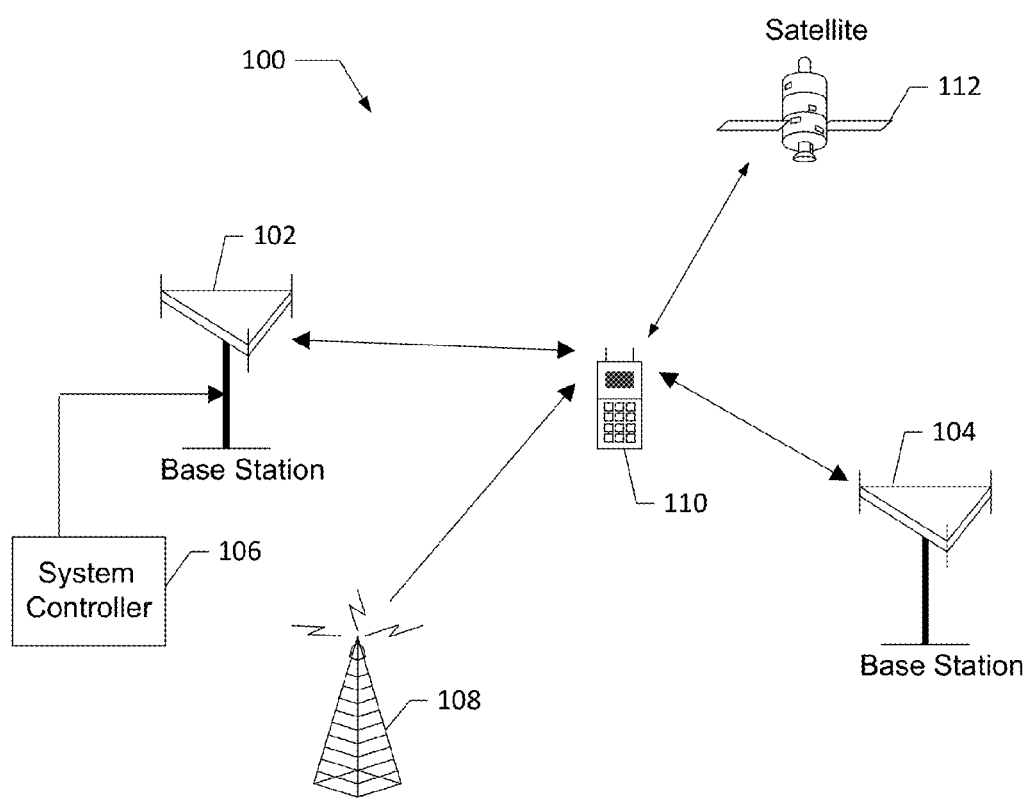
FIG. 1A is an exemplary wireless device communicating with a wireless communication system.

FIG. 1A is an exemplary wireless device 110 communicating with a wireless communication system 100. The wireless system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1A shows wireless system 100 including two base stations 102 and 104 and one system controller 106. In general, a wireless system may include any number of base stations and any set of network entities.

The wireless device 110 may also be referred to as a user equipment (UE), a mobile station, a terminal, an access terminal, a subscriber unit, a station, etc. The wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. The wireless device 110 may communicate with a wireless system 100. The wireless device 110 may also receive signals from broadcast stations (e.g., a broadcast station 108), signals from satellites (e.g., a satellite 112) in one or more global navigation satellite systems (GNSS), etc. The wireless device 110 may support one or more radio technologies for wireless communication such as LTE, WCDMA, CDMA 1×, EVDO, TD-SCDMA, GSM, 802.11, etc.

Figure 1B:
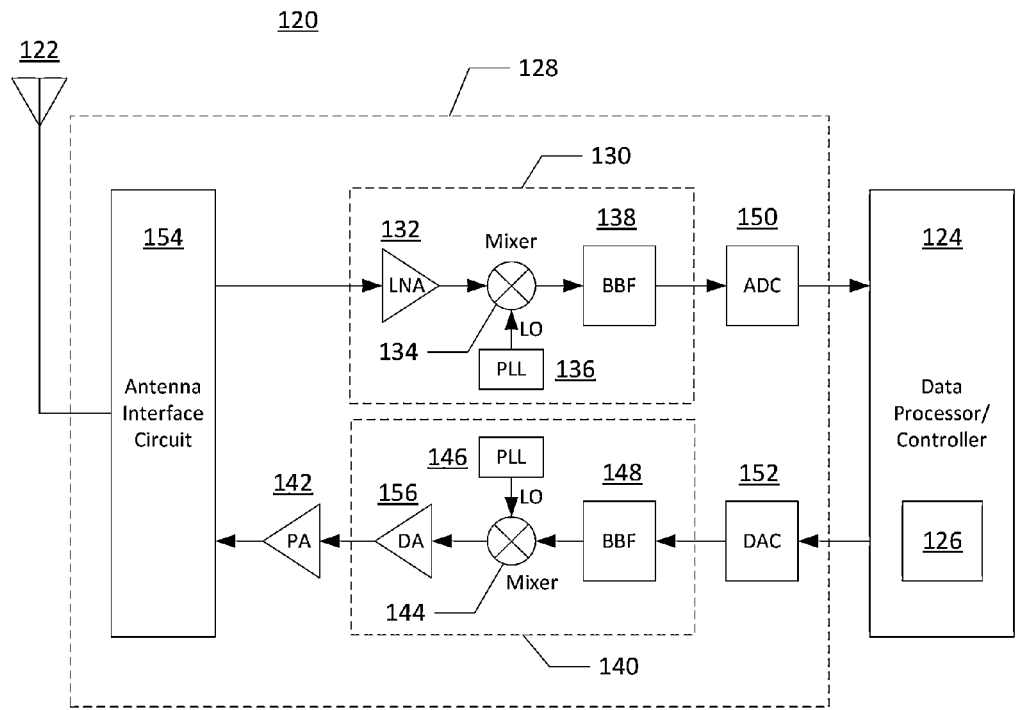
FIG. 1B is a block diagram of an exemplary design of a wireless device that is one embodiment of a wireless device of FIG. 1A.

FIG. 1B is a block diagram of an exemplary design of a wireless device 120 that is one embodiment of a wireless device 110 of FIG. 1A. In this exemplary design, the wireless device 120 includes a transceiver 128 coupled to an antenna 122, and a data processor/controller 124. The transceiver 128 includes antenna interface circuit 154, a receiver path 130, and a transmitter path 140. Antenna interface circuit 154 may include switches, duplexers, transmit filters, receive filters, matching circuits, etc. The data processor/controller 124 may perform various functions for the wireless device 120. For example, the data processor/controller 124 may perform processing for data being received via the receiver path 130 and data being transmitted via the transmitter path 140. The processor/controller 124 may control the operation of various circuits within the transceiver 128. Memory 126 may store program codes and data for the data processor/controller 124. The data processor/controller 124 may be implemented on one or more application specific integrated circuits (ASICs) and/or other ICs. The receiver path 130 includes a low noise amplifier (LNA) 132, a mixer 134, a phase locked loop (PLL) 136, and a baseband filter 138. An analog-to-digital converter (ADC) 150 is placed subsequent to the baseband filter 138 to digitize the baseband signal. The transmitter path 140 includes a baseband filter 148, a PLL 146, a mixer 144, a driver amplifier (DA) 156, and a power amplifier (PA) 142. A digital-to-analog converter (DAC) 152 is placed between the data processor/controller 124 and the baseband filter 148 to convert the digital data to the analog baseband signal. In the illustrated embodiment of FIG. 1B, the receiver path 130 includes PLL 136 and the transmitter path 140 includes PLL 146 to provide local oscillator signals to the mixers 134, 144. However, in other embodiments, both receiver path 130 and transmitter path 140 can use a single common PLL. In one embodiment, the baseband filters 138, 148 are low-pass filters. In a further embodiment, although FIG. 1B shows only one receiver path 130 and one transmitter path 140, both the receiver path and the transmitter path can be configured to include more than one path. For example, the wireless device can be configured with two transmitter paths and three receiver paths.

For data reception, antenna 122 receives signals from base stations and/or other transmitter stations and provides a received RF signal, which is routed through an antenna interface circuit 154 and presented as an input RF signal to the receiver path 130. Within the receiver path 130, the LNA 132 amplifies the input RF signal and provides an output RF signal to the mixer 134. The PLL 136 generates a local oscillator signal. The mixer 134 mixes the output RF signal with the PLL-generated local oscillator signal to downconvert the output RF signal from RF to baseband. The baseband filter 138 filters the downconverted signal to provide an analog input signal to the ADC 150, which converts the analog input signal to the digital data and provides the digital data to the data processor/controller 124. The receiver path 130 may include other elements such as matching circuits, an oscillator, etc.

For data transmission, the data processor/controller 124 processes (e.g., encodes and modulates) data to be transmitted and provides a digital data to the DAC 152, which converts the digital data to an analog output signal and provides the converted analog output signal to the transmitter path 140. Within the transmitter path 140, the baseband filter 148 amplifies and filters the analog output signal. The PLL 146 generates a local oscillator signal. The mixer 144 mixes the filtered analog output signal with the PLL-generated local oscillator signal to upconvert the filtered analog output signal from baseband to RF and provide a modulated RF signal. The transmitter path 140 may include other elements such as matching circuits, an oscillator, etc. The DA 156 and PA 142 receives and amplifies the modulated RF signal and provides a transmit RF signal having the proper output power level. The transmit RF signal is routed through antenna interface circuit 154 and transmitted via antenna 122.

Figure 1C:
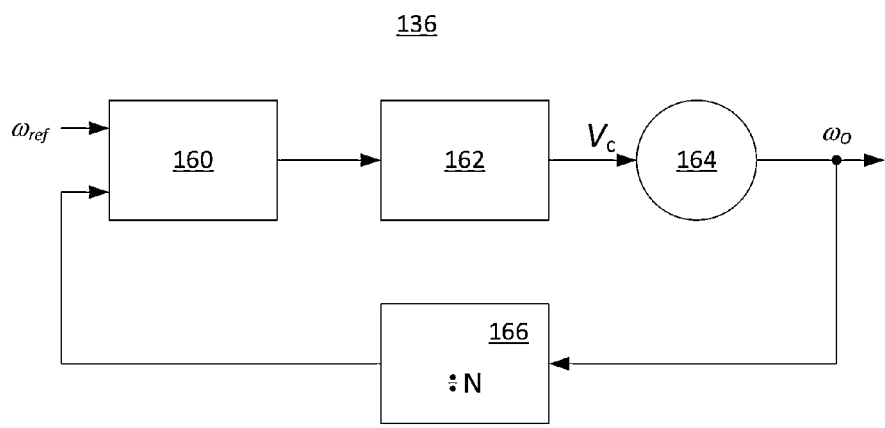
FIG. 1C is a functional block diagram of a PLL in accordance with one embodiment of the present disclosure.
Figure 2A:
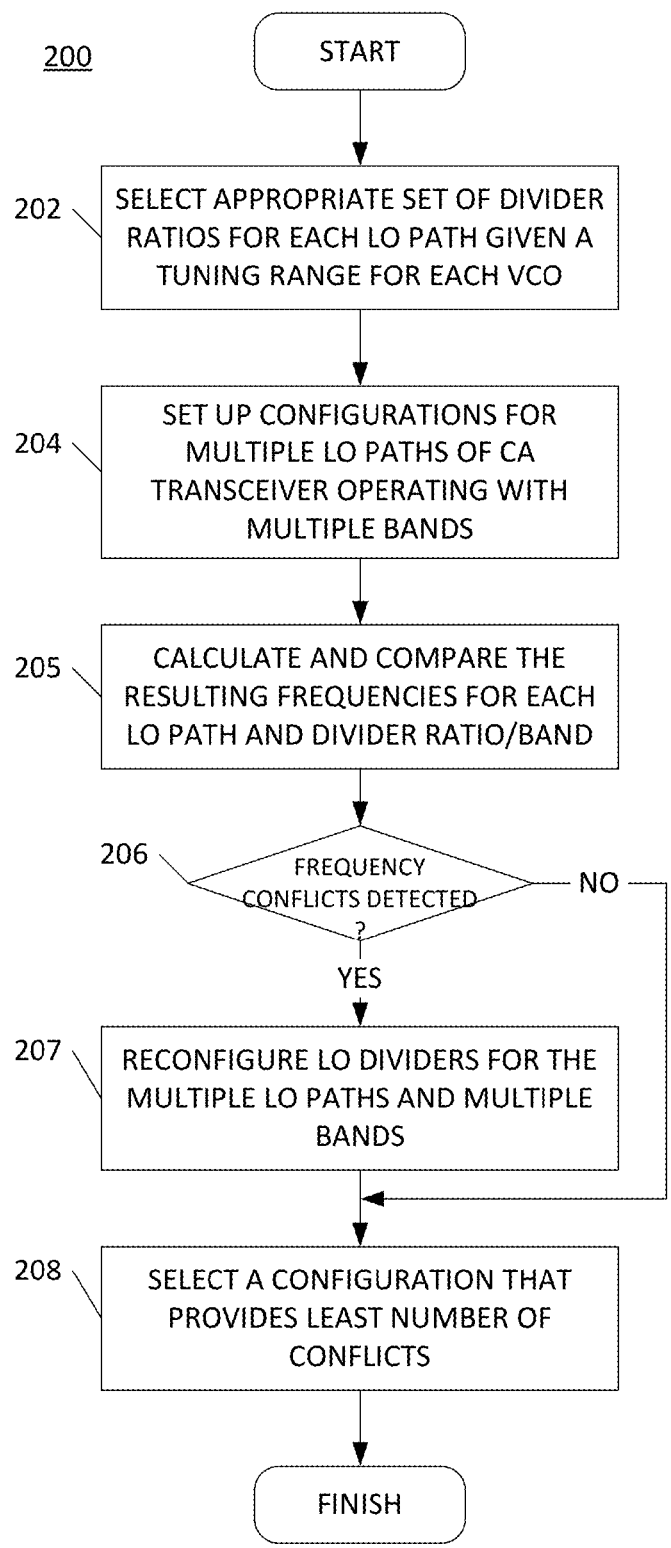
FIG. 2A is a flow diagram illustrating a method for reconfiguring LO dividers to avoid spurious responses in a CA transceiver (e.g., transceiver shown in FIG. 1B) in accordance with one embodiment of the present disclosure.

FIG. 1C is a functional block diagram of a PLL 136 in accordance with one embodiment of the present disclosure. Although the figure indicates that the PLL is designated as 136, the PLL can be used for element 146 as well. In one embodiment, the PLL 136 includes a phase-frequency detector 160, a loop filter 162, a voltage-controlled oscillator (VCO) 164, and a frequency divider 166 situated in the feedback loop from the output of the VCO 164 to the input of the phase-frequency detector 160. In the feedback loop, the output frequency ($\omega_o$) of the VCO 164 is divided by the frequency divider 166 (e.g., divide by N) to produce an input signal for the phase-frequency detector 160. The phase-frequency detector 160 receives the output of the frequency divider 166 and a reference frequency signal ($\omega_{ref}$), and generates an output signal based on a phase difference between its two input signals. For example, an up signal or a down signal may be output by the phase-frequency detector 160 based on whether the divided frequency signal leads or lags the reference frequency signal, which indicates a difference in phase/frequency between these two signals. The loop filter 162 is configured to integrate or accumulate the up or down signals to generate a control voltage $V_c$, which indicates an amount that the divided frequency signal leads or lags the reference frequency signal. The control voltage $V_c$ then controls or adjusts the output frequency ($\omega_o$) of the VCO 160. Thus, the PLL 136 operates to drive the output frequency ($\omega_o$) of the VCO 164 to a frequency based on the reference frequency signal ($\omega_{ref}$) scaled by the divider ratio N of the frequency divider 166, which results in $\omega_o=\omega_{ref}*N$. In various situations (e.g., in a carrier aggregation mode), it is desirable to adjust the divider ratio of the PLL. In one embodiment, the divider ratio is adjusted by the processor 124. FIG. 2A is a flow diagram 200 illustrating a method for reconfiguring LO dividers to avoid spurious responses in a CA transceiver (e.g., transceiver 128 shown in FIG. 1B) in accordance with one embodiment of the present disclosure. At step 202, given a tuning range for each VCO, an appropriate set of divider ratios are selected. Table 1 shown below specifies example divider ratios for each LO path and each band. For example, for CA0 path, divider ratios 6, 4, and 3 can be selected for each of mid band, high band, and ultra-high band, respectively. For CA1 path, divider ratios 4/5/6, 2, and 2 can be selected for each of low band, mid-band, and high band, respectively. For CA2 path, divider ratios 8/10/12, 3/4/6, 3/4, and 2 can be selected for each of low band, mid-band, high band, ultra-high band, respectively. Finally, for CA3 path, divider ratios 2/3/4 and 2 can be selected for each of mid band and high band, respectively.

TABLE 1

| LO Path | Low Band Dividers | Mid-Band Dividers | High Band Dividers | Ultra-high Band Dividers |
|---------|-------------------|-------------------|--------------------|--------------------------|
| CA0     | —                 | 6                 | 4                  | 3                        |
| CA1     | 4, 5, 6           | 2                 | 2                  | —                        |
| CA2     | 8, 10, 12         | 3, 4, 6           | 3, 4               | 2                        |
| CA3     | —                 | 2, 3, 4           | 2                  | —                        |

Configurations for a plurality of LO paths (which may cause spurious responses) of a CA transceiver operating with a plurality of bands are then set up, at step 204. Table 2 shown below specifies example configurations in the transceiver. In Table 2, TX refers to transmitter; PRx refers to primary receiver; SRx refers to a first secondary receiver; SRx2 refers to a second secondary receiver; and SRx3 refers to a third secondary receiver.

TABLE 2

| Config. No. | Configuration Specification |
|-------------|-----------------------------|
| 1 | VCOa (TX, PRx, SRx, SRx2, SRx3, GPS) = VCOb(PRx, SRx, SRx2, SRx3, GPS, TX) |
| 2 | VCOa (TX, PRx, SRx, SRx2, SRx3, GPS)-TX = (PRx, SRx, SRx2, SRx3, GPS, 0) |
| 3 | VCOa (TX, PRx, SRx, SRx2, SRx3, GPS)-2TX = (PRx, SRx, SRx2, SRx3, GPS, 0) |
| 4 | VCOa(TX, PRx, SRx, SRx2, SRx3, GPS)-VCOb(PRx, SRx, SRx2, SRx3, GPS, TX)-TX = (PRx, SRx, SRx2, SRx3, GPS, 0) |

At step 205, once the specified configurations are set up, the resulting frequencies are calculated and compared for each CA path and divider ratios in each band. If frequency conflicts are detected, at step 206, the LO dividers are reconfigured at step 207, for the multiple LO paths and bands. Then, a configuration that provides a least number of frequency conflicts is selected, at step 208.

Figure 2B:
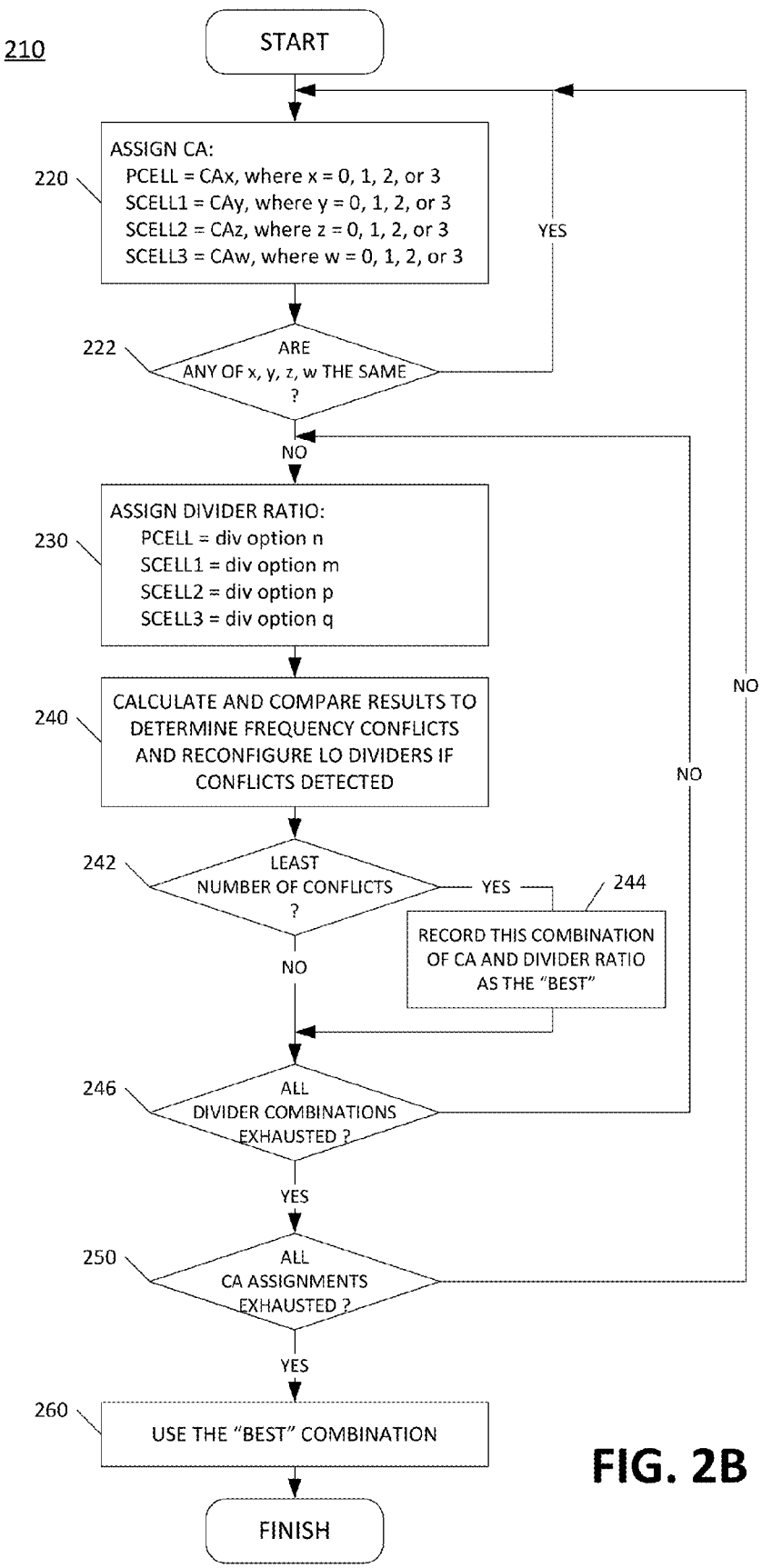
FIG. 2B is a flow diagram illustrating the details involved in steps 204 through 208 of FIG. 2A.

FIG. 2B is a flow diagram 210 illustrating the details involved in steps 204 through 208 of FIG. 2A which includes steps for: (1) setting up configurations for multiple LO paths of CA transceiver operating with multiple bands; (2) calculating and comparing the resulting frequencies for each LO path and divider ratio; (3) reconfiguring LO dividers for the multiple LO paths and multiple bands; and (4) selecting a configuration that provides a least number of frequency conflicts. In the illustrated embodiment of FIG. 2B, the cells are assigned, at step 220, to the CA paths. For example, in one embodiment, PCell is assigned to CA1, Scell1 is assigned to CA3, SCell2 is assigned to CA2, and SCell3 is assigned to CA0. The indices are checked, at step 222, to make sure that each of PCell, SCell1, SCell2, SCell3 are uniquely assigned. This check assures that all serving cells have been assigned. Then, at step 230, the divider ratios are assigned. For example, in one embodiment, PCell is assigned to divider ratio 2 (div 2) in CA1, SCell1 is assigned to divider ratio 2 (div 2) in CA3, SCell2 is assigned to divider ratio 4 (div 4) in CA2, and SCell3 is assigned to divider ratio 3 (div 3) in CA0.

Once the assignments are made and the configurations (that may cause spurious responses) are set, the resulting frequencies are calculated and compared, at step 240, to determine the number of conflicts and reconfigure the LO dividers if the conflicts are detected. In one embodiment, the reconfiguration of the LO dividers includes changing the assignment of the divider ratios to the plurality of serving cells. In another embodiment, the reconfiguration of the LO dividers includes changing the assignment of the plurality of LO paths to the plurality of serving cells. Examples of the reconfiguration of the LO dividers are illustrated in FIGS. 3A-3C, FIGS. 4A-4B, FIGS. 5A-5B and are described below in descriptions corresponding to these figures.

Thus, in step 240, each resulting spurious response is counted as a conflict. If it is determined, at step 242, that the number of conflicts in this configuration contains the least number of conflicts, then the parameters (i.e., the assigned CA path and divider ratio) of this configuration are recorded, at step 244, as the "best" configuration (i.e., the best so far). Then, a first check is made, at step 246, to determine if all divider ratios have been exhausted, and a second check is made, at step 250, to determine if all CA assignments have been exhausted. If the first check at step 246 and the second check at step 250 are satisfied, then the "best" configuration (i.e., the assigned CA path and divider ratio) determined in step 244 is selected, at step 260, as the best configuration that avoids spurious responses in the present transceiver.

Figure 3A:
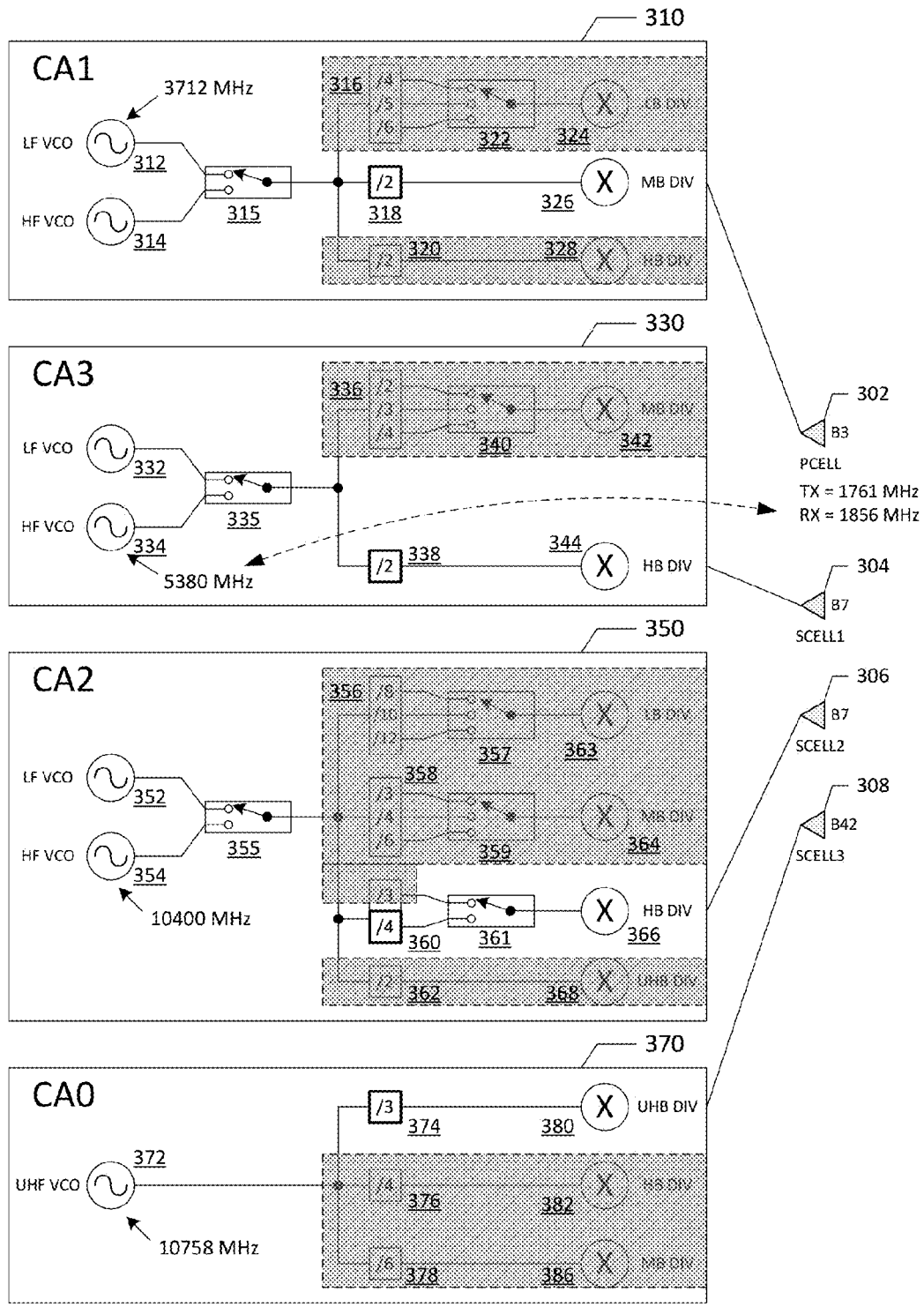
FIG. 3A illustrates one example case (4DL case) of a multiband interference using the method described in FIGS. 2A and 2B.
Figure 3B:
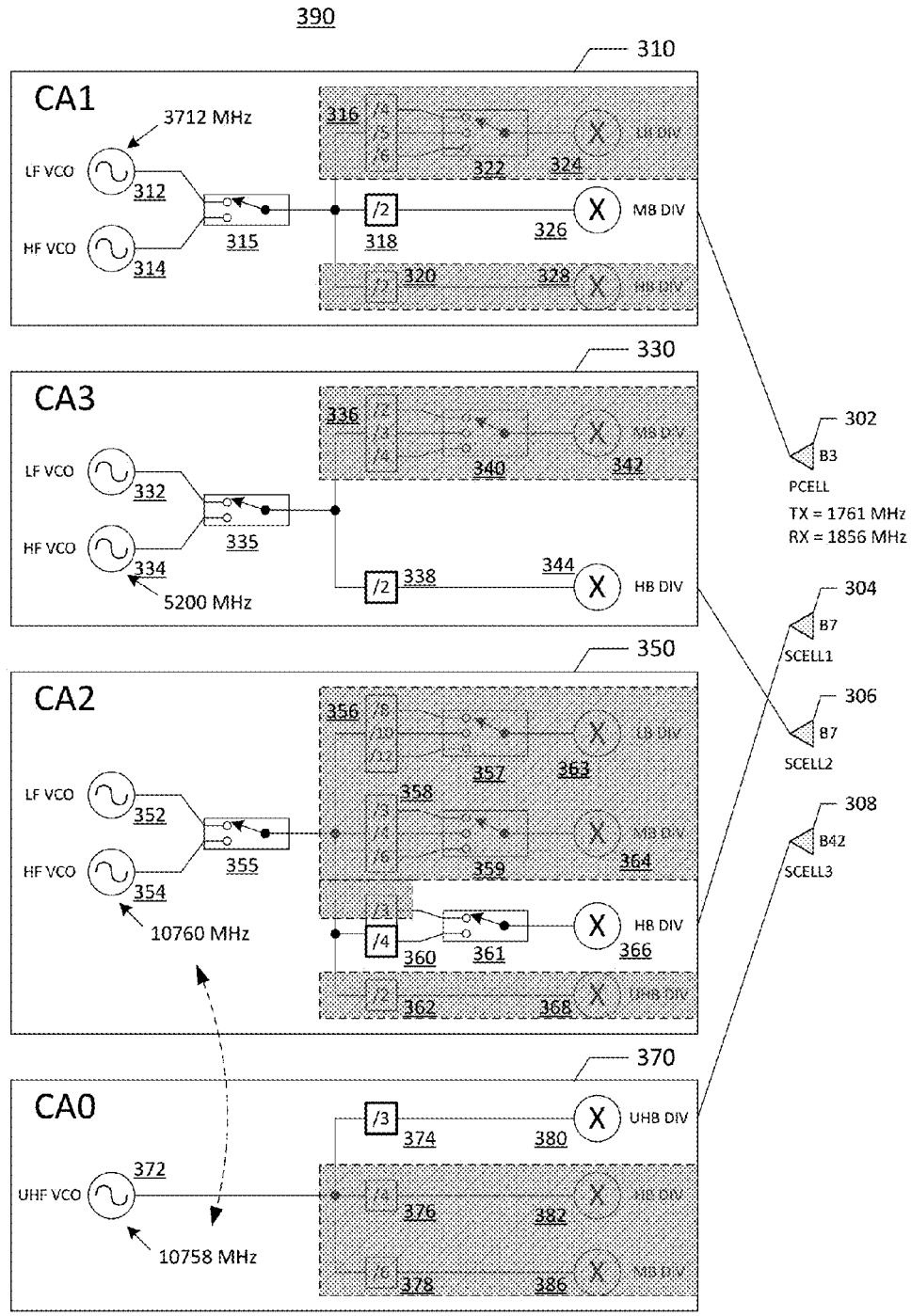
FIG. 3B illustrates one example case (4DL case) of a multiband interference and a first step solution using the method described in FIGS. 2A and 2B.
Figure 3C:
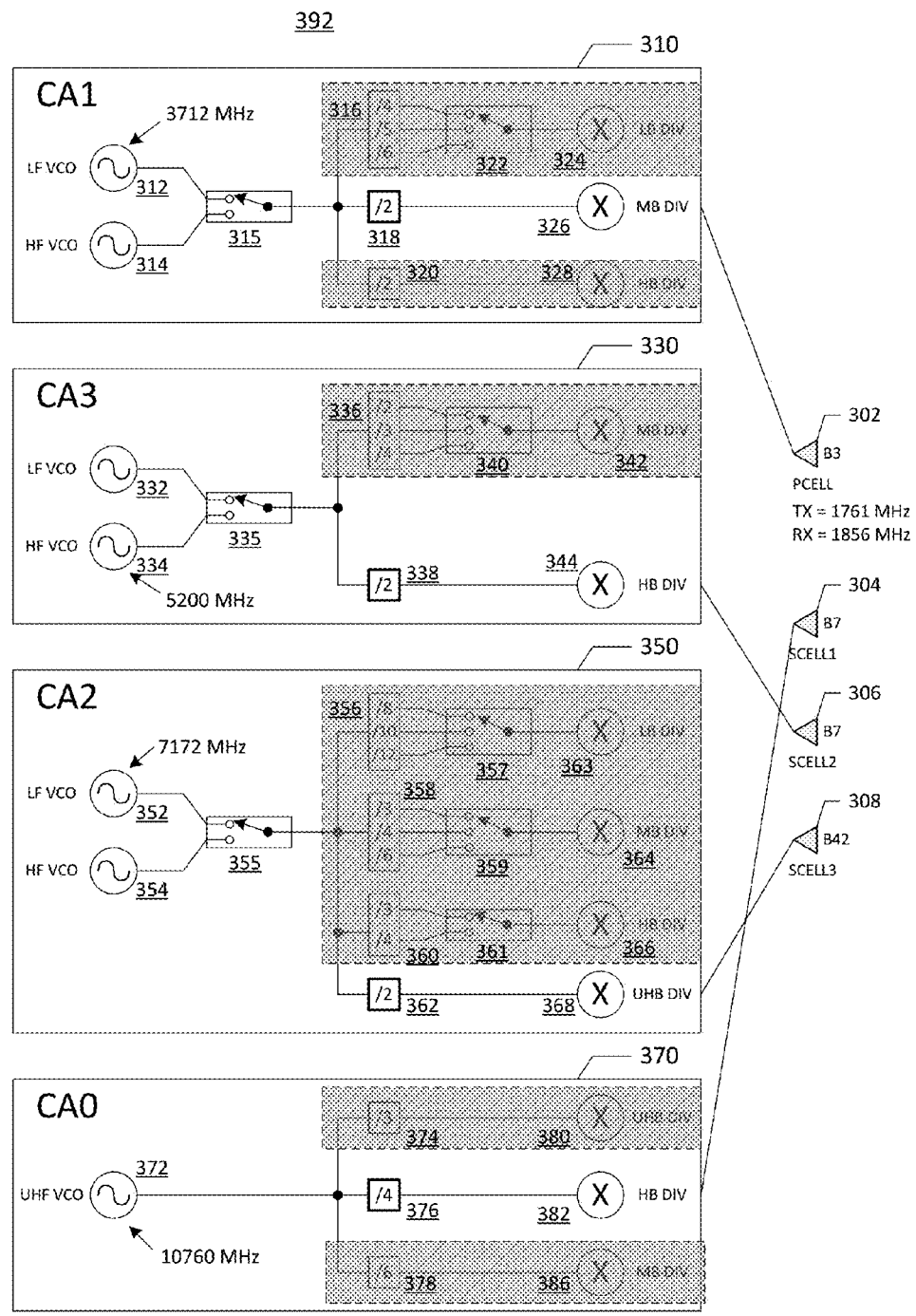
FIG. 3C illustrates one example case (4DL case) of a multiband interference and a second step solution using the method described in FIGS. 2A and 2B.

FIGS. 3A, 3B, and 3C illustrate one example case (4DL case) of a multiband interference for multiple LO paths of a CA transceiver and a two-step solution using the method described in FIGS. 2A and 2B. In these figures, areas that are lightly shaded and included within dotted box(es) are parts of the path that are blocked off and unused.

In the illustrated embodiment of FIG. 3A, the band combination for the LO paths 300 is B3+B7+B7+B42. Path CA1 (310) includes a low frequency (LF) VCO 312 and a high frequency (HF) VCO 314 selectable by switch 315. Path CA1 (310) also includes: divider ratios 4, 5, 6 (316) selectable by switch 322 for a low band (LB) divider 324; divider ratio 2 (318) for a mid-band (MB) divider 326; and divider ratio 2 (320) for a high band (HB) divider 328. Path CA3 (330) includes an LF VCO 332 and an HF VCO 334 selectable by switch 335. Path CA3 (330) also includes: divider ratios 2, 3, 4 (336) selectable by switch 340 for an MB divider 342; and divider ratio 2 (338) for an HB divider 344. Path CA2 (350) includes an LF VCO 352 and an HF VCO 354 selectable by switch 355. Path CA2 (350) also includes: divider ratios 8, 10, 12 (356) selectable by switch 357 for an LB divider 363; divider ratios 3, 4, 6 (358) selectable by switch 359 for an MB divider 364; divider ratios 3, 4 (360) selectable by switch 361 for an HB divider 366; and divider ratio 2 (362) for an ultra-high band (UHB) divider 368. Path CA0 (370) includes an ultra-high frequency (UHF) VCO 372 coupled to: divider ratio 3 (374) for an UHB divider 380; divider ratio 4 (376) for an HB divider 382; and divider ratio 6 (378) for an MB divider 386.

In accordance with step 202 in FIG. 2A and steps 220, 222, 230 in FIG. 2B, band B3 with path CA1 (310) and divider ratio 2 (318) is assigned to PCell 302, band B7 with path CA3 (330) and divider ratio 2 (338) is assigned to SCell1 (304), band B7 intra with path CA2 (350) and divider ratio 4 (360) selected by switch 361 is assigned to SCell2 (306), and band B42 with path CA0 (370) and divider ratio 3 (374) is assigned to SCell3 (308). Next, in accordance with steps 204, 205 in FIG. 2A and step 240 in FIG. 2B, configurations are set up and the resulting frequencies are calculated and compared. In this example case, a spurious response (e.g., a frequency conflict) occurs when the VCO frequency of band B7 assigned to SCell1 (304) (i.e., 5380 MHz) minus two times the transmitter frequency of band B3 assigned to PCell 302 (i.e., 2*1761 MHz), which is equal to 1858 MHz, interferes with the receiver frequency of band B3 (i.e., 1856 MHz). That is, CA3 B7 SCell1 VCO leaks into PCell B3 LNA input and mixes with its own TX B3 and lands inband into RX B3.

FIG. 3B illustrates one example of a first-step attempted solution 390 to the problem presented in FIG. 3A. In the illustrated embodiment of FIG. 3B, in accordance with steps 205-208 in FIG. 2A and steps 240-260 in FIG. 2B, SCell1 B7 (304) and SCell2 B7 (306) are swapped such that SCell1 B7 (304) is assigned to CA2 div 4 (360), whereas SCell2 B7 (306) is assigned to CA3 div 2 (338). However, in the configuration of FIG. 3B, SCell3 B42 (308) is at 3586 MHz, and with div 3 CA0 (374), VCO is at 10758 MHz (i.e., 3*3586 MHz). This causes a strong pulling between the CA2 HF VCO (354) (at 10760 MHz) and the CA0 UHF VCO (372) (at 10758 MHz).

FIG. 3C illustrates one example of a second-step attempted solution 392 to the problem presented in FIG. 3A. In the illustrated embodiment of FIG. 3C, Scell3 B42 (308) is moved to CA2 div 2 (362) VCO while B7 is moved to CA0 div 4 (376) VCO. This configuration solves both the spurious response problem described with respect to FIG. 3A and the coupling problem described with respect to FIG. 3B.

In the illustrated embodiments of FIGS. 3B and 3C, the calculation of frequencies is performed by a processor/controller (e.g., processor/controller 124), while reconfiguration and reassignment of the LO dividers are performed by switches (e.g., switches 322, 340, 357, 359, 361) and connectors (e.g., connections between the LO dividers 324, 326, 328, 342, 344, 363, 364, 366, 368, 380, 382, 386 and the cells 302, 304, 306, 308) under the control of the processor/controller 124.

Figure 4A:
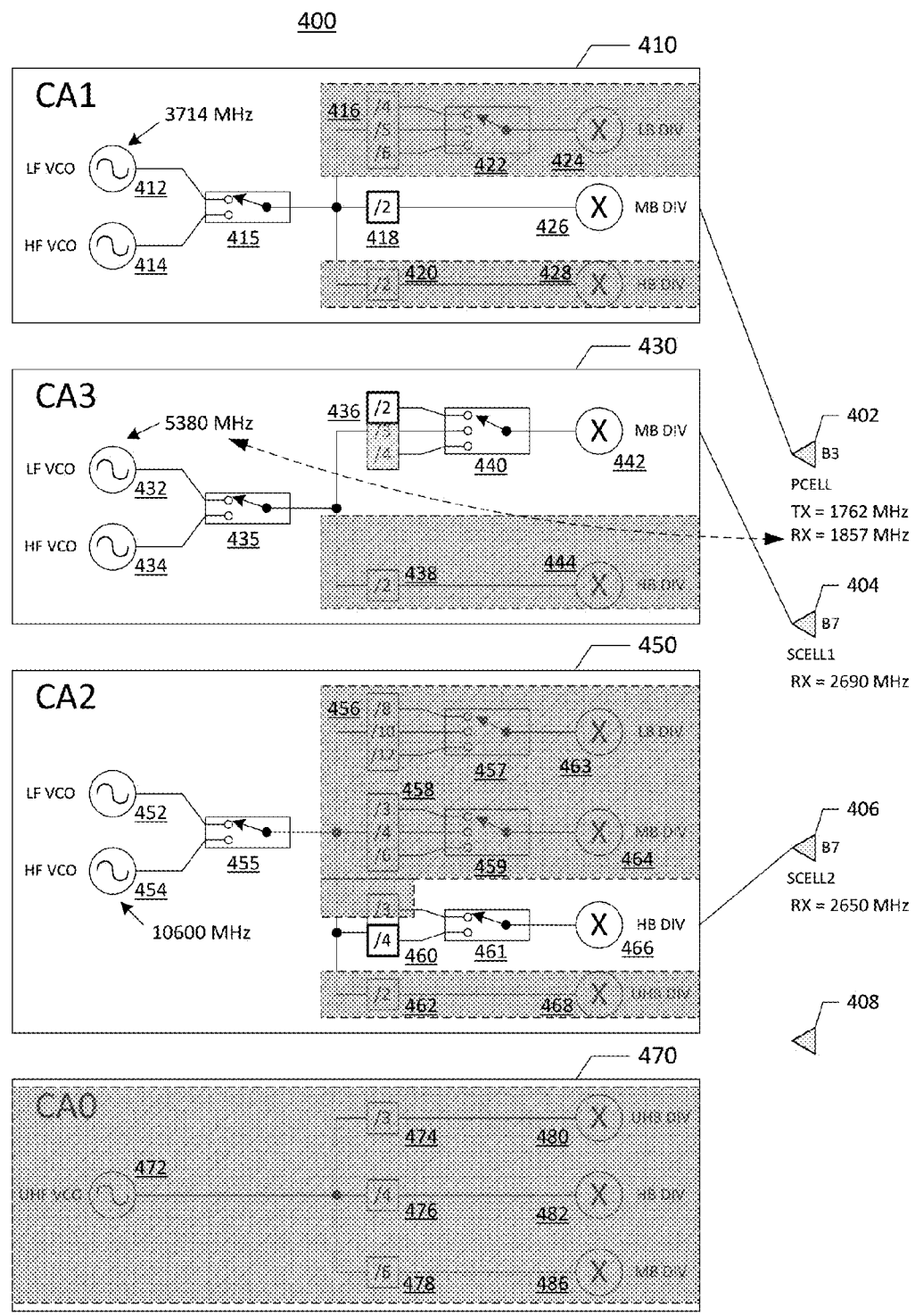
FIG. 4A illustrates another example case (3DL case) of a multiband interference using the method described in FIGS. 2A and 2B.
Figure 4B:
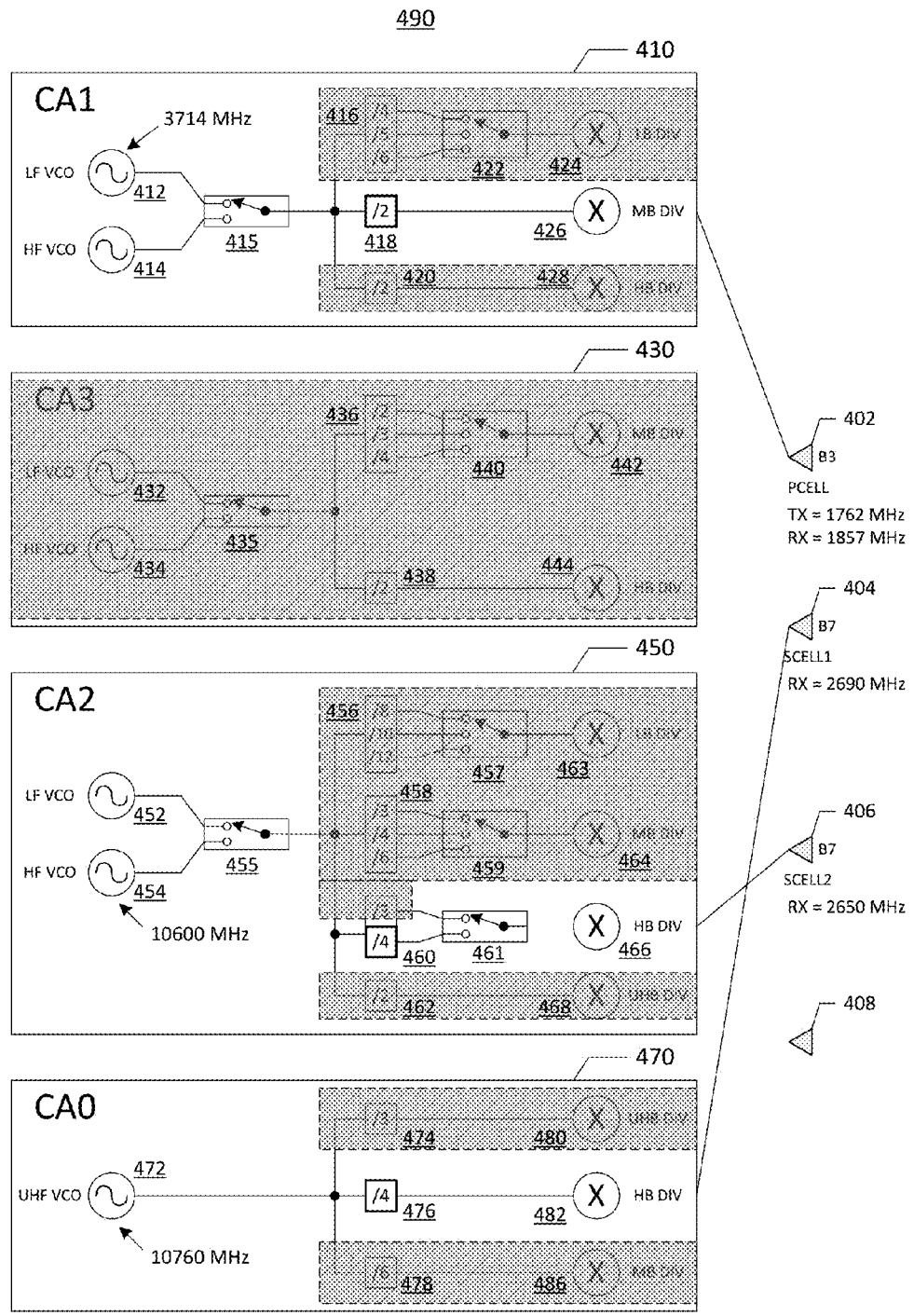
FIG. 4B illustrates another example case (3DL case) of a multiband interference and a solution using the method described in FIGS. 2A and 2B.

FIGS. 4A and 4B illustrate another example case (3DL case) of a multiband interference for multiple LO paths of a CA transceiver and a solution using the method described in FIGS. 2A and 2B.

In the illustrated embodiment of FIG. 4A, the band combination for the LO paths 400 is B3+B7+B7. Path CA1 (410) includes an LF VCO 412 and an HF VCO 414 selectable by switch 415. Path CA1 (410) also includes: divider ratios 4, 5, 6 (416) selectable by switch 422 for an LB divider 424; divider ratio 2 (418) for an MB divider 426; and divider ratio 2 (420) for an HB divider 428. Path CA3 (430) includes an LF VCO 432 and an HF VCO 434 selectable by switch 435. Path CA3 (430) also includes: divider ratios 2, 3, 4 (436) selectable by switch 440 for an MB divider 442; and divider ratio 2 (438) for an HB divider 444. Path CA2 (450) includes an LF VCO 452 and an HF VCO 454 selectable by switch 455. Path CA2 (450) also includes: divider ratios 8, 10, 12 (456) selectable by switch 457 for an LB divider 463; divider ratios 3, 4, 6 (458) selectable by switch 459 for an MB divider 464; divider ratios 3, 4 (460) selectable by switch 461 for an HB divider 466; and divider ratio 2 (462) for an ultra-high band (UHB) divider 468. Path CA0 (470) includes an ultra-high frequency (UHF) VCO 472 coupled to: divider ratio 3 (474) for an UHB divider 480; divider ratio 4 (476) for an HB divider 482; and divider ratio 6 (478) for an MB divider 486.

Thus, band B3 with path CA1 (410) and divider ratio 2 (418) is assigned to PCell 402, band B7 with path CA3 (430) and divider ratio 2 (436) selected by switch 440 is assigned to SCell1 404, band B7 intra with path CA2 (450) and divider ratio 4 (460) selected by switch 461 is assigned to SCell2 (406), and SCell3 (408) is unused. Again, the configurations are set up and the resulting frequencies are calculated and compared. In this example case, the problem occurs when the VCO frequency of band B7 assigned to SCell1 (404) (i.e., 5380 MHz) minus two times the transmitter frequency of band B3 assigned to PCell (402) (i.e., 2*1762 MHz), which is equal to 1856 MHz, interferes with the receiver frequency of band B3 (i.e., 1857 MHz). That is, CA3 B7 SCell1 (404) VCO leaks into PCell (402) B3 LNA input and mixes with its own TX B3 and lands into RX B3 to cause LNA out-of-band $3^{rd}$ order distortion (i.e., OOB IP3).

FIG. 4B illustrates one example of a solution 490 to the problem presented in FIG. 4A. In the illustrated embodiment of FIG. 4B, SCell1 B7 (404) is moved to use CA0 high band div 4 (476) (which was previously unused) to address the interference problem.

Figure 5A:
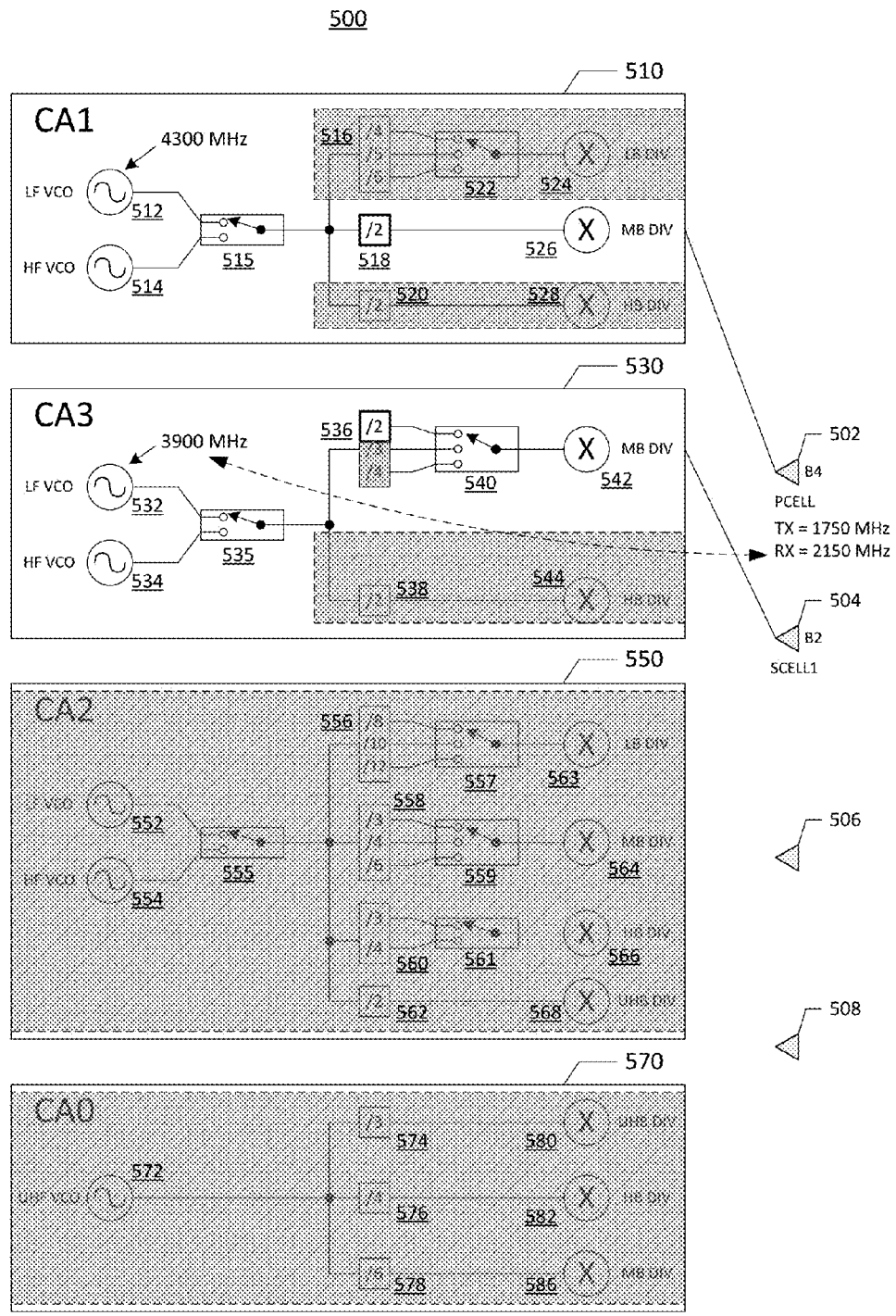
FIG. 5A illustrates another example case (2DL case) of a multiband interference using the method described in FIGS. 2A and 2B.
Figure 5B:
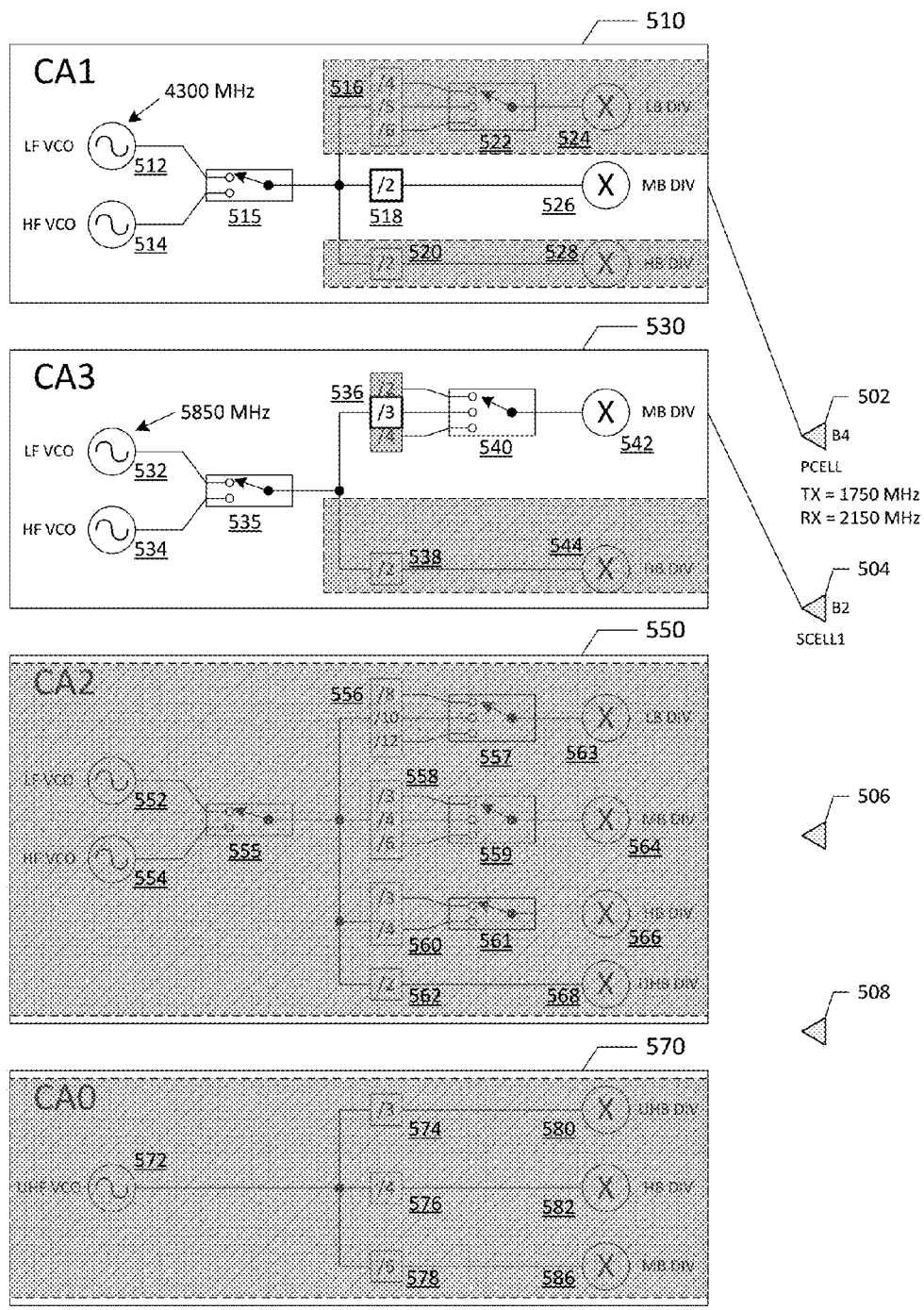
FIG. 5B illustrate another example case (2DL case) of a multiband interference and a solution using the method described in FIGS. 2A and 2B.

FIGS. 5A and 5B illustrate another example case (2DL case) of a multiband interference for multiple LO paths of a CA transceiver and a solution using the method described in FIGS. 2A and 2B.

In the illustrated embodiment of FIG. 5A, the band combination for the LO paths 500 is B4+B2. Path CA1 (510) includes an LF VCO 512 and an HF VCO 514 selectable by switch 515. Path CA1 (510) also includes: divider ratios 4, 5, 6 (516) selectable by switch 522 for an LB divider 524; divider ratio 2 (518) for an MB divider 526; and divider ratio 2 (520) for an HB divider 528. Path CA3 (530) includes an LF VCO 532 and an HF VCO 534 selectable by switch 535. Path CA3 (530) also includes: divider ratios 2, 3, 4 (536) selectable by switch 540 for an MB divider 542; and divider ratio 2 (538) for an HB divider 544. Path CA2 (550) includes an LF VCO 552 and an HF VCO 554 selectable by switch 555. Path CA2 (550) also includes: divider ratios 8, 10, 12 (556) selectable by switch 557 for an LB divider 563; divider ratios 3, 4, 6 (558) selectable by switch 559 for an MB divider 564; divider ratios 3, 4 (560) selectable by switch 561 for an HB divider 566; and divider ratio 2 (562) for an ultra-high band (UHB) divider 568. Path CA0 (570) includes an ultra-high frequency (UHF) VCO 572 coupled to: divider ratio 3 (574) for an UHB divider 580; divider ratio 4 (576) for an HB divider 582; and divider ratio 6 (578) for an MB divider 586.

Thus, band B4 with path CA1 510 and divider ratio 2 (518) is assigned to PCell 502, band B2 with path CA3 (530) and divider ratio 2 (536) is assigned to SCell1 504, and SCell2 (506) and SCell3 (508) are unused. Again, the configurations are set up and the resulting frequencies are calculated and compared. In this example case, the problem occurs when the VCO frequency of band B2 assigned to SCell1 (504) (i.e., 3900 MHz) minus the transmitter frequency of band B4 assigned to PCell (502) (i.e., 1750 MHz), which is equal to 2150 MHz, interferes with the receiver frequency of band B4 (i.e., 2150 MHz). That is, CA3 B2 SCell1 (504) VCO leaks into PCell (502) B4 LNA input and mixes with its own TX B4 and lands into RX B4 to cause LNA out-of-band $2^{nd}$ order distortion (i.e., OOB IP2).

FIG. 5B illustrates one example of a solution 590 to the problem presented in FIG. 5A. In the illustrated embodiment of FIG. 5B, SCell1 B2 504 is moved to use low band div 3 (536) to address the interference problem.

Figure 6:
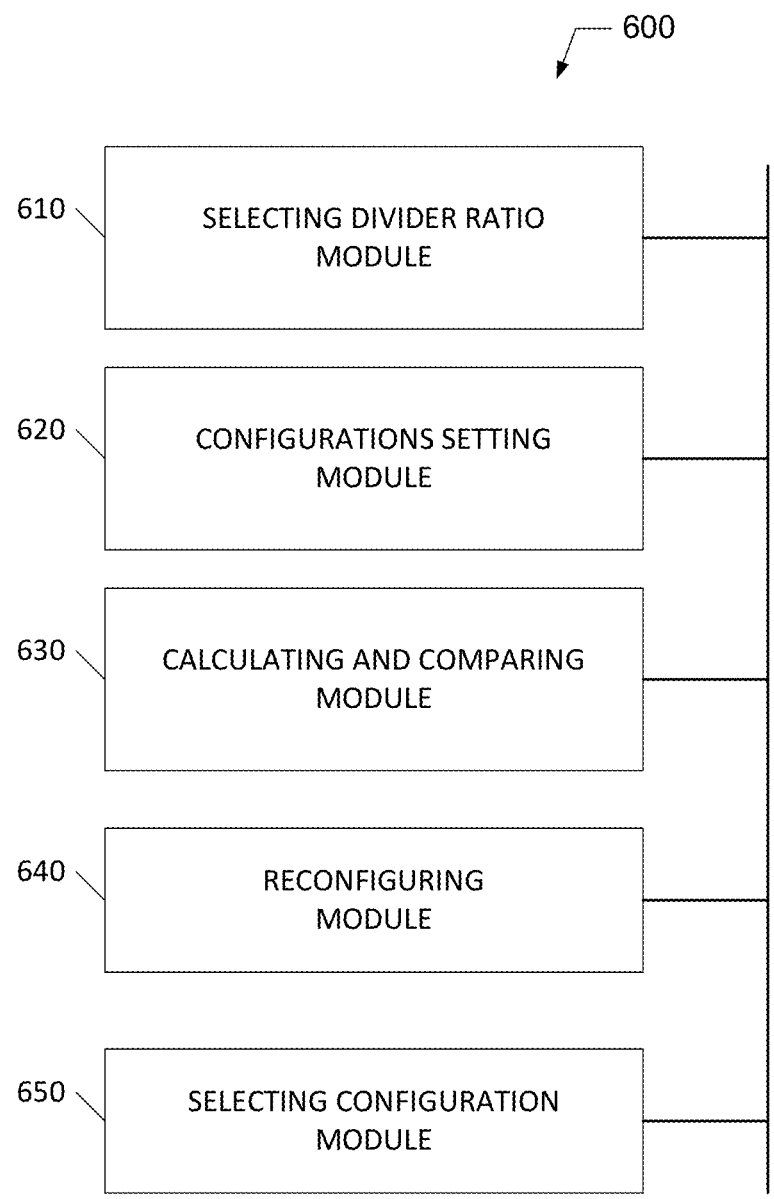
FIG. 6 is an apparatus for reconfiguring LO dividers to avoid spurious responses in a CA transceiver (e.g., transceiver shown in FIG. 1B) in accordance with one embodiment of the present disclosure.

FIG. 6 is an apparatus 600 for reconfiguring LO dividers to avoid spurious responses in a CA transceiver (e.g., transceiver 128 shown in FIG. 1B) in accordance with one embodiment of the present disclosure. The apparatus 600 includes a first module 610 for selecting an appropriate set of divider ratios given a tuning range for each VCO. The apparatus 600 also includes a second module 620 for setting up configurations for a plurality of LO paths (which may cause spurious responses) of a CA transceiver operating with a plurality of bands. The apparatus 600 also includes a third module 630 for calculating and comparing the resulting frequencies for each CA path and divider ratios in each band. The apparatus 600 also includes a fourth module 640 for reconfiguring LO dividers for the plurality of LO paths and the plurality of bands. The apparatus 600 further includes a fifth module 650 for selecting a configuration that provides a least number of conflicts.

Although several embodiments of the disclosure are described above, many variations of the disclosure are possible. Further, features of the various embodiments may be combined in combinations that differ from those described above. Moreover, for clear and brief description, many descriptions of the systems and methods have been simplified. Many descriptions use terminology and structures of specific standards. However, the disclosed systems and methods are more broadly applicable.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block without departing from the disclosure.

The various illustrative logical blocks, units, steps, components, and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Further, circuits implementing the embodiments and functional blocks and modules described herein can be realized using various transistor types, logic families, and design methodologies.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent presently preferred embodiments of the disclosure and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method comprising:
   setting up a plurality of configurations for a plurality of local oscillator (LO) paths of a carrier aggregation (CA) transceiver operating with a plurality of bands;
   calculating and comparing frequencies for each LO path of the plurality of LO paths and at least one divider ratio of LO dividers for each band of the plurality of bands to identify frequency conflicts; and
   reconfiguring the LO dividers for the plurality of LO paths and the plurality of bands when the frequency conflicts are identified.

2. The method of claim 1, further comprising
   selecting a configuration from the plurality of configurations which results in a least number of the frequency conflicts.

3. The method of claim 1, wherein the plurality of LO paths of the CA transceiver comprises at least one transmit (Tx) path and at least one receive (Rx) path.

4. The method of claim 1, wherein setting up a plurality of configurations comprises
   assigning the at least one divider ratio of the LO dividers to a plurality of serving cells.

5. The method of claim 4, wherein the plurality of serving cells comprises a primary cell and a plurality of secondary cells.

6. The method of claim 4, wherein reconfiguring the LO dividers comprises
   changing an assignment of the at least one divider ratios to the plurality of serving cells.

7. The method of claim 1, wherein setting up a plurality of configurations comprises
   assigning the plurality of LO paths to a plurality of serving cells.

8. The method of claim 7, wherein reconfiguring the LO dividers comprises
   changing an assignment of the plurality of LO paths to the plurality of serving cells.

9. The method of claim 1, wherein the frequency conflicts comprise a spurious response which causes out-of-band second order distortion on a low noise amplifier (LNA) of a receiver of the CA transceiver.

10. The method of claim 9, wherein the spurious response comprises
    leaking of a VCO frequency into an input of the LNA which mixes with a band of a transmitter of the CA transceiver.

11. The method of claim 1, wherein setting up a plurality of configurations comprises
    selecting the at least one divider ratio for each LO path given a tuning range for each VCO of the CA transceiver.

12. An apparatus for reconfiguring local oscillator (LO) dividers to avoid spurious responses in a carrier aggregation (CA) transceiver, the apparatus comprising:
    means for setting up a plurality of configurations for a plurality of local oscillator (LO) paths of the carrier aggregation (CA) transceiver operating with a plurality of bands;
    means for calculating and comparing frequencies for each LO path of the plurality of LO paths and at least one divider ratio of LO dividers for each band of the plurality of bands to identify frequency conflicts; and
    means for reconfiguring the LO dividers for the plurality of LO paths and the plurality of bands when the frequency conflicts are identified.

13. The apparatus of claim 12, further comprising
    means for selecting a configuration from the plurality of configurations that provides a least number of the frequency conflicts.

14. The apparatus of claim 13, wherein means for setting up a plurality of configurations comprises
    means for assigning the at least one divider ratio of the LO dividers to a plurality of serving cells.

15. The apparatus of claim 14, wherein means for reconfiguring the LO dividers comprises
    means for changing an assignment of the at least one divider ratios to the plurality of serving cells.

16. A method comprising:
    first assigning a plurality of divider ratios of LO dividers in a CA transceiver to a plurality of serving cells;
    second assigning a plurality of LO paths to the plurality of serving cells;
    calculating and comparing frequencies for each LO path of the plurality of LO paths to identify frequency conflicts; and
    reconfiguring the LO dividers for the plurality of LO paths when the frequency conflicts are identified.

17. The method of claim 16, further comprising
    selecting a configuration of the first assigning and the second assigning that provides a least number of the frequency conflicts.

18. The method of claim 16, wherein reconfiguring the LO dividers comprises
    changing an assignment of the plurality of divider ratios to the plurality of serving cells.

19. The method of claim 16, wherein reconfiguring the LO dividers comprises
    changing an assignment of the plurality of LO paths to the plurality of serving cells.

20. A carrier aggregation (CA) transceiver, comprising:
    a plurality of local oscillator (LO) paths configured to operate with a plurality of bands; and
    a processor coupled to the plurality of LO paths and configured to calculate and compare frequencies for each LO path of the plurality of LO paths and at least one divider ratio of LO dividers for each band of the plurality of bands to identify frequency conflicts, the processor configured to reconfigure the LO dividers for the plurality of LO paths and the plurality of bands when the frequency conflicts are identified.

21. The CA transceiver of claim 20, wherein the processor is configured to select configurations of the LO dividers for the plurality of LO paths and the plurality of bands which results in a least number of the frequency conflicts.

22. The CA transceiver of claim 20, wherein the plurality of LO paths comprises at least one transmit (Tx) path and at least one receive (Rx) path.

23. The CA transceiver of claim 20, further comprising
    a plurality of switches controlled by the processor, the plurality of switches is configured to enable the at least one divider ratio of the LO dividers to be assigned to a plurality of serving cells.

24. The CA transceiver of claim 23, wherein the plurality of serving cells comprises a primary cell and a plurality of secondary cells.

25. The CA transceiver of claim 20, wherein the LO dividers comprise a low band divider, a mid-band divider, and a high band divider.

26. The CA transceiver of claim 20, wherein the plurality of LO paths comprises paths CA0, CA1, CA2, and CA3.

* * * * *